United States Patent
Hsu et al.

(10) Patent No.: US 11,239,552 B2
(45) Date of Patent: Feb. 1, 2022

(54) BEAMFORMING DEVICE, CALIBRATION METHOD AND CALIBRATION SYSTEM FOR THE SAME

(71) Applicant: WISTRON NEWEB CORPORATION, Hsinchu (TW)

(72) Inventors: Chih-Min Hsu, Hsinchu (TW); Ting-Yu Wu, Hsinchu (TW); Wei-Shan Chang, Hsinchu (TW); Jia-Jiuan Wu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 149 days.

(21) Appl. No.: 16/876,158

(22) Filed: May 18, 2020

(65) Prior Publication Data

US 2020/0373660 A1 Nov. 26, 2020

Related U.S. Application Data (60) Provisional application No. 62/851,111, filed on May 22, 2019.

(30) Foreign Application Priority Data

Apr. 15, 2020 (TW) ................. 109112569

(51) Int. Cl.
*H01Q 3/26* (2006.01)
*H04B 7/06* (2006.01)
(Continued)

(52) U.S. Cl.
CPC .............. *H01Q 3/267* (2013.01); *H01Q 3/36* (2013.01); *H04B 7/0617* (2013.01); *H04B 17/12* (2015.01); *H04B 17/21* (2015.01)

(58) Field of Classification Search
CPC .... H04B 7/0617; H04B 7/0456; H04B 17/12; H04B 17/21; H04B 7/0408; H04B 7/0482; H04B 7/086; H04B 7/0417; H04B 7/0626
See application file for complete search history.

(56) References Cited

U.S. PATENT DOCUMENTS

| 10,720,979 B1 * | 7/2020 | Paulotto | H04B 7/0682 |
| 2017/0366242 A1 * | 12/2017 | Lee | H04B 7/0408 |

(Continued)

*Primary Examiner* — Khanh C Tran
(74) *Attorney, Agent, or Firm* — McClure, Qualey & Rodack, LLP (57) ABSTRACT

A beam forming device, a calibration method and a calibration system using the same are provided. The beam forming device includes a processor, a memory unit, a baseband circuit, and a plurality of antenna modules. The antenna modules each includes multiple antenna elements, and multiple phase shifters and multiple of amplifiers respectively corresponding to the antenna elements. The memory unit stores a reference codebook, a plurality of calibration codebooks and instructing data, each of the plurality of calibration codebooks includes a plurality of records of calibration control data divided by a plurality of target patterns, and a plurality of predetermined phase differences that are different from each other respectively existed between the plurality of calibration codebooks and the reference codebook. The instruction data is used for instructing the beamforming device to use one of the reference codebook and the plurality of calibration codebooks in transmitting and receiving signals.

11 Claims, 8 Drawing Sheets

(51) Int. Cl.
*H01Q 3/36* (2006.01)
*H04B 17/21* (2015.01)
*H04B 17/12* (2015.01)

(56) References Cited

U.S. PATENT DOCUMENTS

| | | | |
|---|---|---|---|
| 2019/0044756 A1* | 2/2019 | Zhao | H04B 7/0478 |
| 2020/0220590 A1* | 7/2020 | Sun | H04L 25/0226 |
| 2020/0336221 A1* | 10/2020 | Sebastian | H04B 17/102 |
| 2021/0098882 A1* | 4/2021 | Paulotto | H01Q 1/243 |
| 2021/0249768 A1* | 8/2021 | Ioffe | H01Q 21/06 |

* cited by examiner

BEAMFORMING DEVICE, CALIBRATION METHOD AND CALIBRATION SYSTEM FOR THE SAME

CROSS-REFERENCE TO RELATED PATENT APPLICATION

This application claims the benefit of priority to Taiwan Patent Application No. 109112569, filed on Apr. 15, 2020. The entire content of the above identified application is incorporated herein by reference.

This application claims priority from the U.S. Provisional Patent Application Ser. No. 62/851,111 filed May 22, 2019, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a beam forming device, a calibration method and a calibration system for the same, and more particularly to a beam forming device, a calibration method and a calibration system for the same capable of calibrating phase differences between antenna modules.

BACKGROUND OF THE DISCLOSURE

In the field of millimeter wave communications, path loss associated with an antenna module of a beamforming device is much greater than similar devices with lower operating frequencies. Beamforming technology is commonly used to increase the communication range. The most common architecture utilizes one baseband module to control a plurality of antenna modules. In high-frequency applications, due to the small wavelength, it is difficult to meet equipment requirements during manufacturing. For example, a wavelength is only about 5 mm at an operating frequency of 60 GHz. This means that whenever a path change of 0.1 mm occurs, a phase difference of 36 degrees will be caused between the antenna modules.

When there is a phase difference between the antenna modules, the phase difference will result in a lower equivalent isotropically radiated power (EIRP) during beamforming, and even lead to poor side-lobe levels (SLL), thereby causing an actual beamforming pattern to differ from an ideal beamforming pattern by a deviation.

Therefore, correcting the phase difference between the antenna modules of the beamforming device by means of calibration to overcome the above-mentioned defects has become an important issue in the art.

SUMMARY OF THE DISCLOSURE

In response to the above-referenced technical inadequacies, the present disclosure provides a beam forming device, a calibration method and a calibration system for the same capable of calibrating phase differences between antenna modules.

In one aspect, the present disclosure provides a calibration method used for a beam forming device including a processor, a memory unit, a baseband circuit and a plurality of antenna module, and the calibration method includes: storing a reference codebook in the memory unit, in which the reference codebook includes a plurality of records of reference control data divided by a plurality of target patterns, and the plurality of records of reference control data are used to set a plurality of antenna elements of each of the antenna modules, and a plurality of phase shifters and a plurality of amplifiers respectively corresponding to the plurality of antenna elements; generating a plurality of calibration codebooks according to the reference codebook and a plurality of predetermined phase differences to be stored in the memory unit, in which the plurality of predetermined phase differences are different from each other, and the plurality of calibration codebooks each include a plurality of records of calibration control data divided by the plurality of target pattern; selecting a predetermined target pattern, and configuring, according to the predetermined target pattern, the baseband circuit to use the plurality of records of calibration control corresponding to the predetermined target pattern in the reference codebook and the plurality of calibration codebooks to respectively control the plurality of antenna module to generate a plurality of test signals; configuring a receiver to receive the plurality of test signals; configuring a computing device to process the plurality of test signals to respectively calculate equivalent isotropically radiated powers (EIRP) of the predetermined target patterns respectively corresponding to the plurality of test signals and generate a plurality of test results; and configuring the computing device to set one of the reference codebook and the calibration codebooks having the maximum EIRP as a predetermined codebook used in transmitting and receiving signals in the predetermined target pattern by the beamforming device according to the plurality of test results.

In another aspect, the present disclosure provides a calibration system for a beamforming device, and includes a computing device, a beamforming device, and a receiver. The beam forming device is connected to the computing device. The beam forming device includes a processor, a memory unit, a baseband circuit, and a plurality of antenna modules. The plurality of antenna modules each includes a plurality of antenna elements, and a plurality of phase shifters and a plurality of amplifiers respectively corresponding to the plurality of antenna elements. The computing device is configured to store a reference codebook into the memory unit, the reference codebook includes a plurality of records of reference control data divided by a plurality of target patterns, and the plurality of records of reference control data are used to set a plurality of antenna elements of each of the antenna module, and a plurality of phase shifters and a plurality of amplifiers respectively corresponding to the plurality of antenna elements. The computing device is configured to generate a plurality of calibration codebooks according to the reference codebook and a plurality of predetermined phase differences to be stored in the memory unit, the plurality of predetermined phase differences are different from each other, and the plurality of calibration codebooks each include a plurality of records of calibration control data divided by the plurality of target pattern. The baseband circuit is configured, according to a predetermined target pattern selected, to use the plurality of records of calibration control corresponding to the predetermined target pattern in the reference codebook and the plurality of calibration codebooks to respectively control the plurality of antenna module to generate a plurality of test signals. The receiver is configured to receive the plurality of test signals. The computing device is configured to process the plurality of test signals to respectively calculate equivalent isotropically radiated powers (EIRP) of the predetermined target patterns respectively corresponding to the plurality of test signals and generate a plurality of test results. The computing device is configured to set one of the reference codebook and the calibration codebooks having the maximum EIRP as a predetermined codebook used in transmitting and receiving signals in the predetermined target pattern by the beamforming device according to the plurality of test results.

In yet another aspect, the present disclosure provides a beamforming device, which includes a processor, a memory unit, a fundamental frequency circuit, and a plurality of antenna modules. The plurality of antenna modules each includes a plurality of antenna elements, and a plurality of phase shifters and a plurality of amplifiers respectively corresponding to the plurality of antenna elements. The memory unit stores a reference codebook, a plurality of calibration codebooks and instructing data, each of the plurality of calibration codebooks includes a plurality of records of calibration control data divided by a plurality of target patterns, and a plurality of predetermined phase differences that are different from each other respectively existed between the plurality of calibration codebooks and the reference codebook. The instruction data is used for instructing the beamforming device to use one of the reference codebook and the plurality of calibration codebooks in transmitting and receiving signals with a plurality of predetermined target patterns.

Therefore, the beam forming device, the calibration method and the calibration system for the same provided by the present disclosure can generate a plurality of calibration codebooks corresponding to the plurality of antenna modules according to the plurality of predetermined phase differences and the reference codebook, and set predetermined codebooks for the beamforming device in transmitting and receiving signals according to test results. Therefore, when an actual beamforming pattern differs from an ideal beamforming pattern by a deviation due to errors between the antenna modules, the radiation pattern can be redirected to the desired direction through calibration, thereby making the overall performance match original design specifications.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
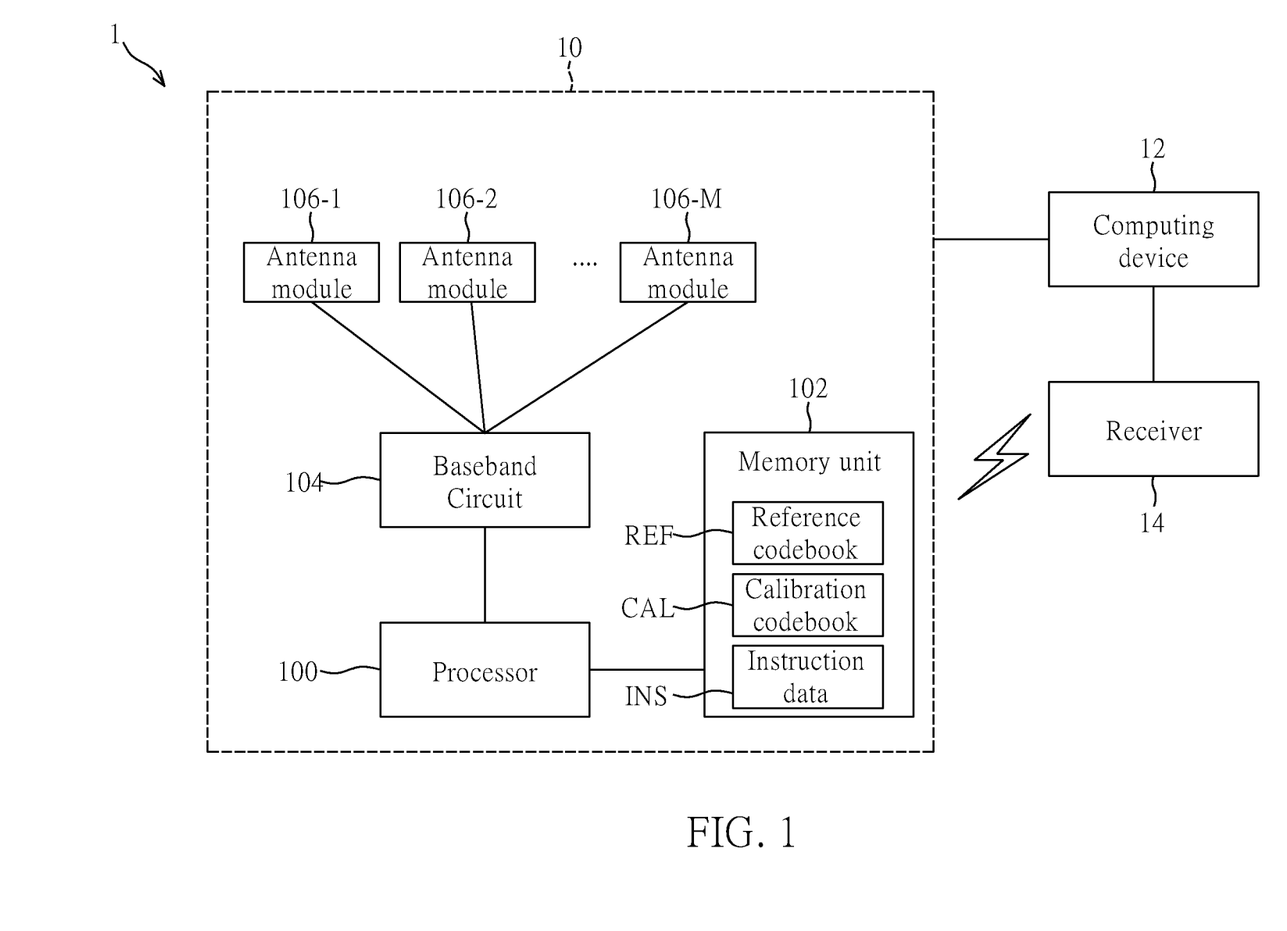
FIG. 1 is a block diagram of a calibration system for a beamforming device according to an embodiment of the present disclosure.

FIG. 1 is a block diagram of a calibration system for a beamforming device according to an embodiment of the present disclosure. Reference is made to FIG. 1, a first embodiment of the present disclosure provides a calibration system 1, which includes a beamforming device 10, a computing device 12 and a receiver 14.

Figure 2:
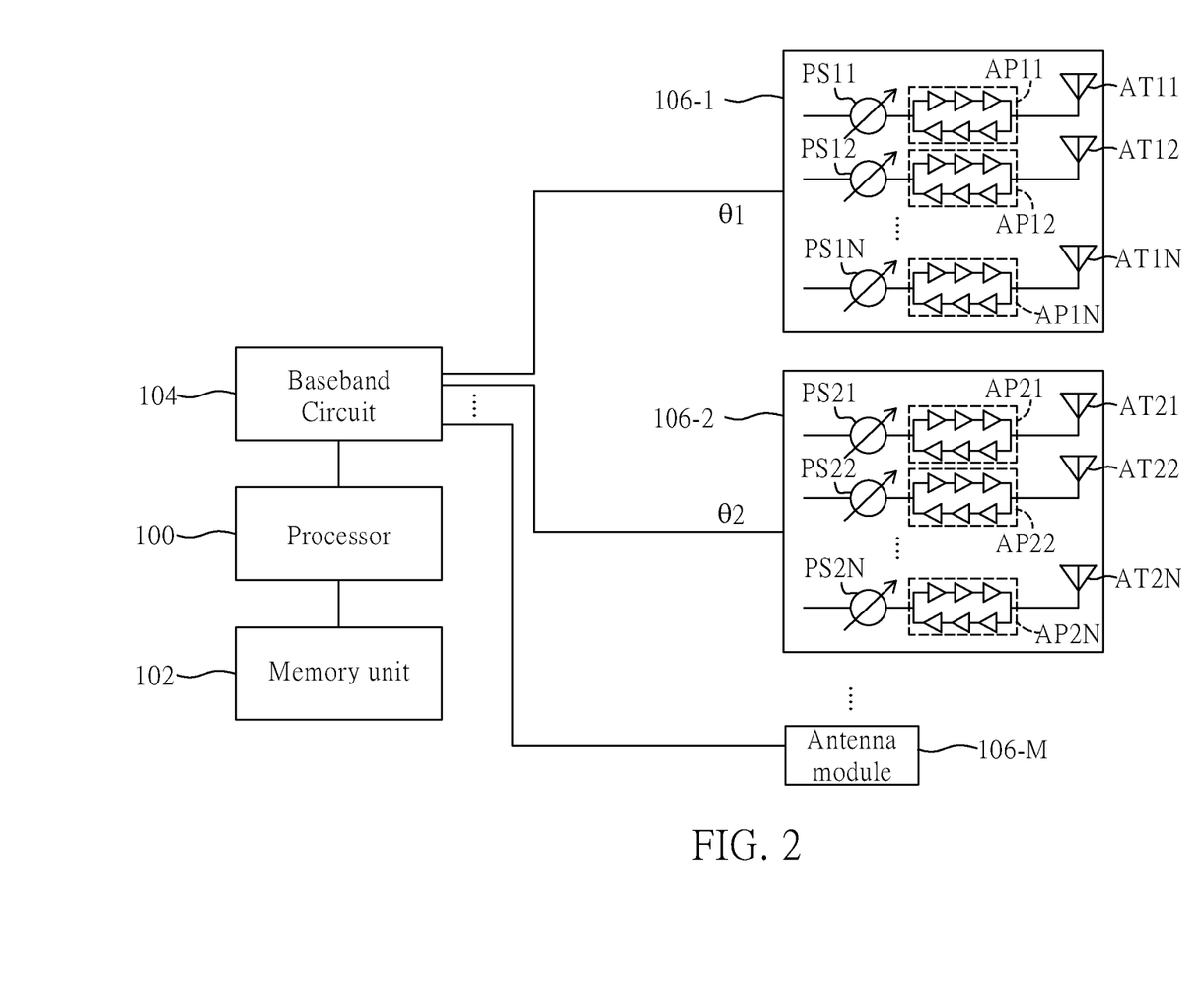
FIG. 2 is a schematic diagram of architecture of a beamforming device according to an embodiment of the present disclosure.

The beamforming device 10 can include a processor 100, a memory unit 102, a baseband circuit 104, and a plurality of antenna modules 106-1, 106-2, . . . , 106-M. Reference can be further made to FIG. 2, which is a schematic diagram of architecture of a beamforming device according to an embodiment of the present disclosure. As shown in FIG. 2, the antenna modules 106-1, 106-2 . . . 106-M each includes a plurality of antenna elements, and a plurality of phase shifters and a plurality of amplifiers respectively corresponding to the plurality of antenna elements. For example, the antenna module 106-1 can include antenna elements AT11, AT12, . . . , AT1N, and phase shifters PS11, PS12 . . . PS1N and amplifier circuits AP11, AP12 . . . AP1N respectively corresponding to the antenna elements AT11, AT12, . . . , AT1N. The phase shifters PS11, PS12, . . . , PS1N can set different shifting phases for individual antenna elements AT11, AT12 . . . AT1N, and the amplifier circuits AP11, AP12, . . . , AP1N can each include a plurality amplifiers to amplify signals phase-shifted by the phase shifters PS11, PS12, . . . , PS1N, thereby achieving the desired beamforming, and the number of the amplifiers is not limited to the number shown in FIG. 2.

In addition, the processor 100 can be, for example, a microcontroller, a microprocessor, or a digital signal processor (DSP), which is used to obtain control data referred to as "codebook" to assign corresponding phase and amplifier parameters to the antenna elements AT11, AT12, . . . , AT1N, and the baseband circuit 104 may be, for example, a baseband processor that controls the antenna modules 106-1, 106-2, . . . , 106-M based on the assigned phase and amplifier parameters.

The antenna module 106-1 can also include a radio frequency circuit. The radio frequency circuit includes a digital to analog converter (DAC) to convert baseband digital signal from the baseband circuit 104 into an analog radio frequency signal. Similarly, the antenna module 106-2 can include antenna elements AT21, AT22, . . . , AT2N, and phase shifters PS21, PS22, . . . , PS2N and amplifier circuits AP21, AP22, . . . , AP2N respectively corresponding to the antenna elements AT21, AT22, . . . , AT2N.

The beamforming device 10 shown in FIG. 2 includes a plurality of antenna modules 106-1, 106-2, . . . , 106-M, and the antenna modules 106-1, 106-2 . . . 106-M may have errors due to process deviations. When these hardware errors exist in the beamforming device 10, a main transmission direction of the beamforming may be shifted, transmitted in the wrong direction, or beam energy may be attenuated, due to gain and phase errors of hardware, and correct beamforming will be difficult to achieve. For example, when designing a codebook for the antenna module 106-1, a phase difference θ 1 of the baseband circuit 104 and the antenna module 106-1 is a fixed value, and the architecture of the antenna module 106-2 is the same as the antenna module 106-1. In theory, a phase difference θ 2 of the baseband circuit 104 and the antenna module 106-2 should be the same as the phase difference θ 1. However, practically, different RF circuits cause unpredictable phase deviations, if the same codebook is utilized, angle and SLL of the maximum EIRP of beamforming may be directly affected. Considering the influence caused by the hardware error, the calibration system and calibration method for the beamforming device of the present disclosure need to be utilized.

In the present embodiment, the computing device 12 may be a microcontroller, a microprocessor, a digital signal processor (DSP), or an application specific integrated circuit (ASIC), digital logic circuits, mobile computing devices, computers and other electronic devices that can provide computing capabilities. In an embodiment, the computing device 12 may be a computer configured to be electrically connected to the receiver 14, so as to obtain required information from the receiver 14.

The receiver 14 can be, for example, a horn antenna, a wireless base station, or a mobile device. The beamforming device 10 and the receiver 14 can communicate via wireless signal transmission. The receiver 14 may include, for example, a power sensor for detecting strength of the wireless signal from the beamforming device 10. The receiver 20 can measure the signal strength of the beamforming device 10 at different angles.

Figure 3:
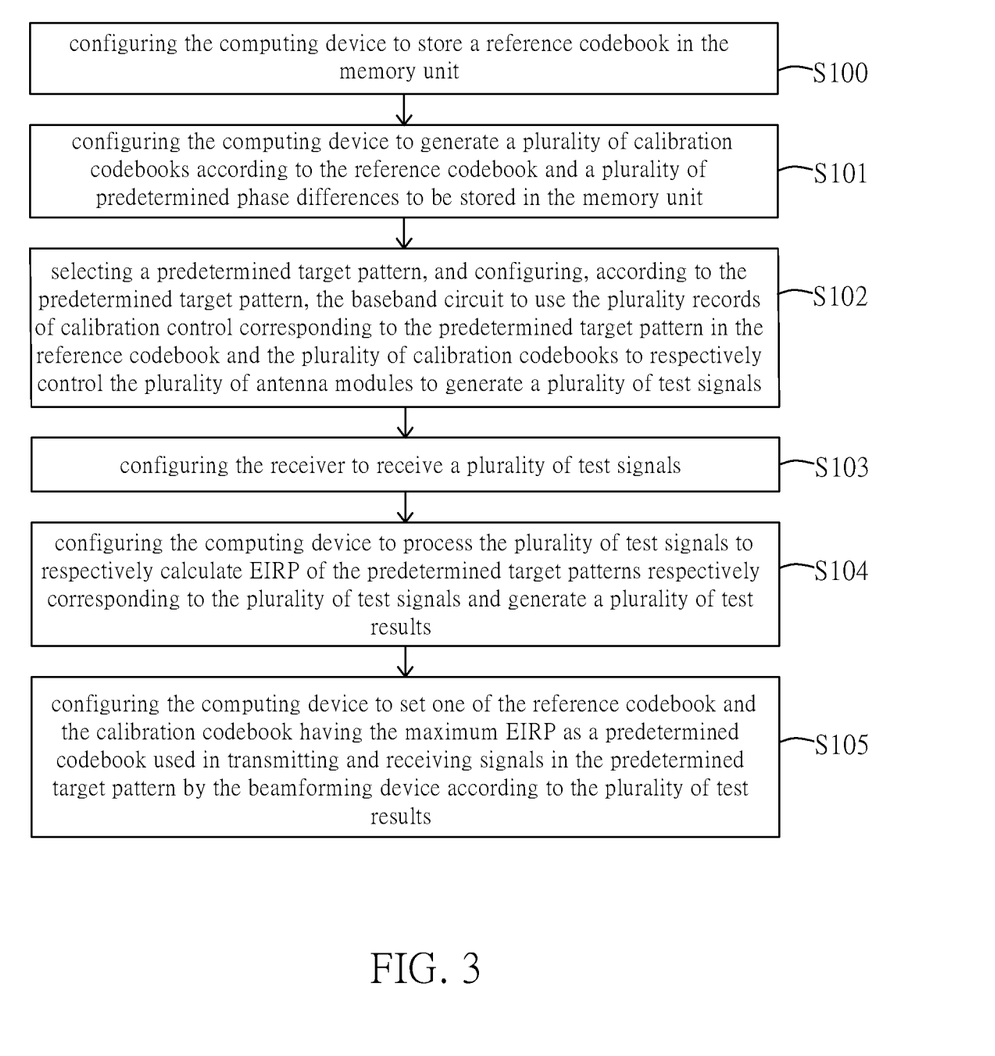
FIG. 3 is a flowchart of a calibration method for a beamforming device according to an embodiment of the present disclosure.

Reference is made to FIG. 3, which is a flowchart of a calibration method for a beamforming device according to an embodiment of the present disclosure. Referring to FIG. 3, an embodiment of the present disclosure provides a calibration method for a beamforming device, and the calibration method is suitable for the calibration system 1 of the foregoing embodiment and includes at least the following steps:

Step S100: configuring the computing device to store a reference codebook REF in the memory unit. In this case, the reference codebook REF includes a plurality of records of reference control data divided by a plurality of target patterns, and the plurality of records of reference control data are used to set a plurality of antenna elements of each of the antenna modules, and a plurality of phase shifters and a plurality of amplifiers respectively corresponding to the plurality of antenna elements.

Taking two antenna modules as an example, the reference codebook REF can be shown in Table 1 below:

TABLE 1

| | | Antenna element 1 | Antenna element 2 | | Antenna element 2N |
|---|---|---|---|---|---|
| Pattern 1 | Phase | 0 degrees | 90 degrees | . . . | 180 degrees |
| | Amplifier | ON | ON | | OFF |
| Pattern 2 | Phase | 0 degrees | 90 degrees | | 180 degrees |
| | Amplifier | ON | ON | | OFF |
| | | . | | | |
| | | . | | | |
| Pattern L | Phase | 0 degrees | 90 degrees | . . . | 180 degrees |
| | Amplifier | ON | ON | | OFF |

In the reference codebook REF, each of the plurality of records of reference control data includes a plurality of phase shifter reference parameters and a plurality of amplifier reference parameters used for setting each of the plurality of antenna modules, the plurality of phase shifter reference parameters correspond to a plurality of reference phases, and the plurality of amplifier reference parameters correspond to a plurality of switching state codes used to indicate switching states of the plurality of amplifiers (for example, 1 for ON, and 0 for OFF). As shown in Table 1, the reference codebook REF can include a plurality of records of reference control data for pattern 1 through pattern L. Pattern 1 through pattern L are radiation patterns pointing at different angles. For example, taking two antenna modules 106-1 and 106-2 as an example, the two antenna modules 106-1 and 106-2 totally include antenna elements AT11, AT12 to AT2N (as shown in FIG. 2), and each record of control data includes phases of the phase shifters and parameters for turning the amplifiers on or off corresponding to antenna elements AT11, AT12 to AT2N. The phase shifters may be, for example, 2-bit phase shifters, and switchable phases of the phase shifter are respectively 0 degrees, 90 degrees, 180 degrees, and 270 degrees, which can be used as the reference phases mentioned above, but the present disclosure is not limited thereto.

Figure 4A:
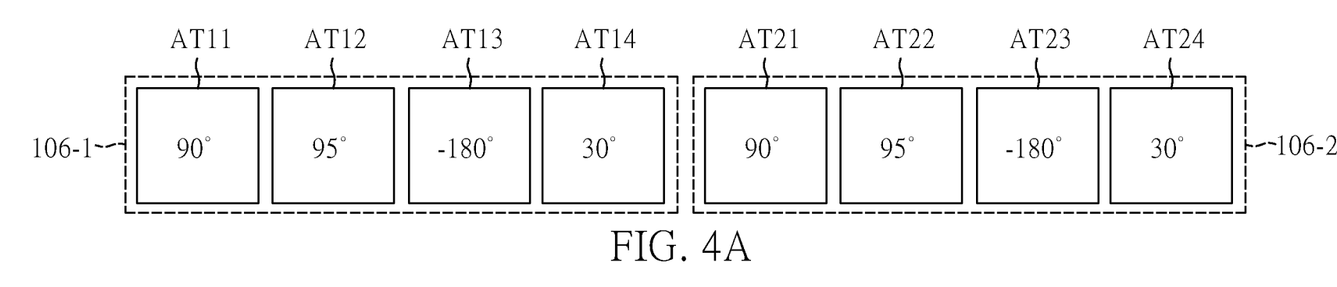
FIGS. 4A to 4C are schematic diagrams for generating a plurality of phases of a reference codebook according to an embodiment of the present disclosure.
Figure 4B:
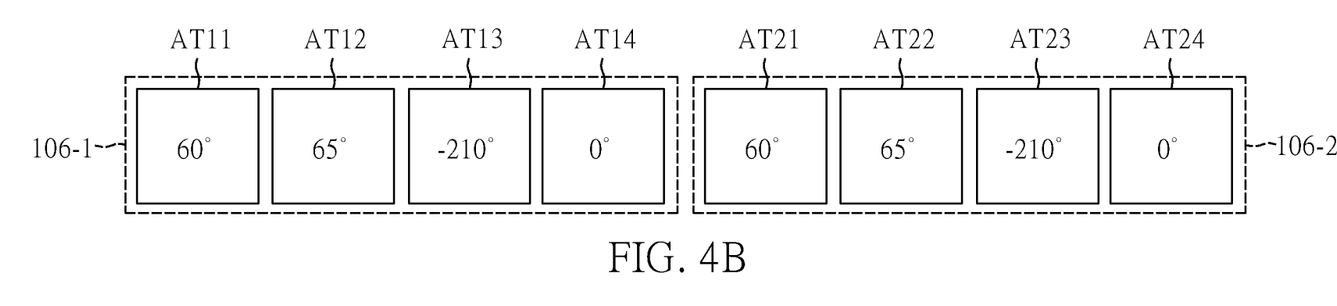
Figure 4C:
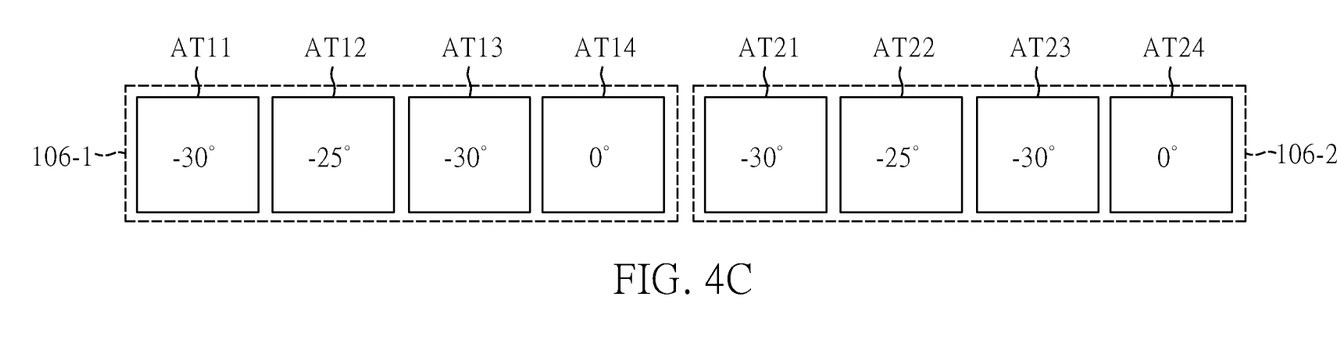

Taking the two antenna modules 106-1 and 106-2 as an example, each antenna module has four antenna elements, such as the antenna module 106-1 includes antenna elements AT11, AT12, AT13, and AT14, and the antenna module 106-2 includes antenna elements AT21, AT22, AT23 and AT24. Generation of the reference codebook REF can refer to FIGS. 4A, 4B and 4C. FIGS. 4A to 4C are schematic diagrams for generating a plurality of phases of a reference codebook according to an embodiment of the present disclosure. As shown in FIGS. 4A, 4B, and 4C, for example, electric field information is measured at an angle of 0 degrees by setting the pattern 1, and initial phases of the antenna elements AT11, AT12, AT13, and AT14 of the antenna module 106-1 shown in FIG. 4A can be measured as 90, 95, −180, and 30 degrees, respectively, in which a signal gain generated by the antenna element AT14 is the strongest. Therefore, based on the antenna element AT14, 90, 95, −180, and 30 degrees of the initial phases of the antenna elements AT11, AT12, AT13 and AT14 are respectively shifted by −30 degrees, such that the phases of antenna elements AT11, AT12, AT13, and AT14 become 60, 65, −210, and 0 degrees, as shown in FIG. 4B. In the reference codebook REF, phases of the antenna elements AT21, AT22, AT23 and AT24 follow the shifted phases, which are 60, 65, −210, and 0 degrees, respectively.

Next, by adjusting the phase shifters corresponding to the antenna elements AT11, AT12, AT13, and AT14, the phases of the antenna units AT11, AT12, AT13, and AT14 are minimized based on a phase reference value, for example, 0 degrees. It should be noted that, since a RF circuit of the antenna module has built-in phase shifters PS11 through PS2N with a precision of 2 bits, it can perform minimize phase matching by $360/2^2$ degrees (i.e., 90 degrees), that is, the phases of the antenna elements AT11, AT12, AT13, and AT14 are respectively adjusted by phase shifter parameters of 270 degrees, 270 degrees, 180 degrees, and 0 degrees to obtain −30 degrees, −25 degrees, −30 degrees, and 0 degrees. At this time, the reference codebook REF is obtained at the pattern 1, that is, the pattern with an angle of 0 degrees, and the phase shifter parameters for controlling the antenna elements AT11, AT12, AT13, and AT14 of the antenna module 106-1 are 270 degrees, 270 degrees, 180 degrees and 0 degrees. In addition, after the phases of the antenna elements AT21, AT22, AT23, and AT24 are shifted in the same manner by −30 degrees and minimized based on 0 degrees, phases of −30 degrees, −25 degrees, −30 degrees, and 0 degrees are also obtained, and corresponding phase shifter parameters of are also 270 degrees, 270 degrees, 180 degrees and 0 degrees.

Next, for other angles, that is, pattern 2 to pattern L, phase shifter parameters of other patterns can be generated in the same manner by rotating the beamforming device 10 or the receiver 14 to obtain the reference codebook REF.

Returning to the calibration method of the present disclosure, the method proceeds to step S101: configuring the computing device to generate a plurality of calibration codebooks CAL according to the reference codebook REF and a plurality of predetermined phase differences to be stored in the memory unit. In this case, the plurality of predetermined phase differences are different from each other, and the plurality of calibration codebooks CAL each includes a plurality of records of calibration control data divided by a plurality of target patterns.

Taking two antenna modules as an example, one of the calibration codebook CAL can be shown in Table 2 below, including a plurality of records of calibration control data. Each of the plurality of records of calibration control data includes a plurality of phase shifter calibration parameters and a plurality of amplifier calibration parameters used for setting each of the plurality of antenna modules.

TABLE 2

| Calibration codebook 1 | | | | | |
|---|---|---|---|---|---|
| | | Antenna element 1 | Antenna element 2 | | Antenna element 2N |
| Pattern 1 | Phase Amplifier | 0 degrees ON | 90 degrees ON | ... | 180 degrees OFF |
| Pattern 2 | Phase Amplifier | 0 degrees ON | 90 degrees ON | | 180 degrees OFF |
| Pattern L | Phase Amplifier | 0 degrees ON | 90 degrees ON | ... | 180 degrees OFF |

Figures 5A, 5B:
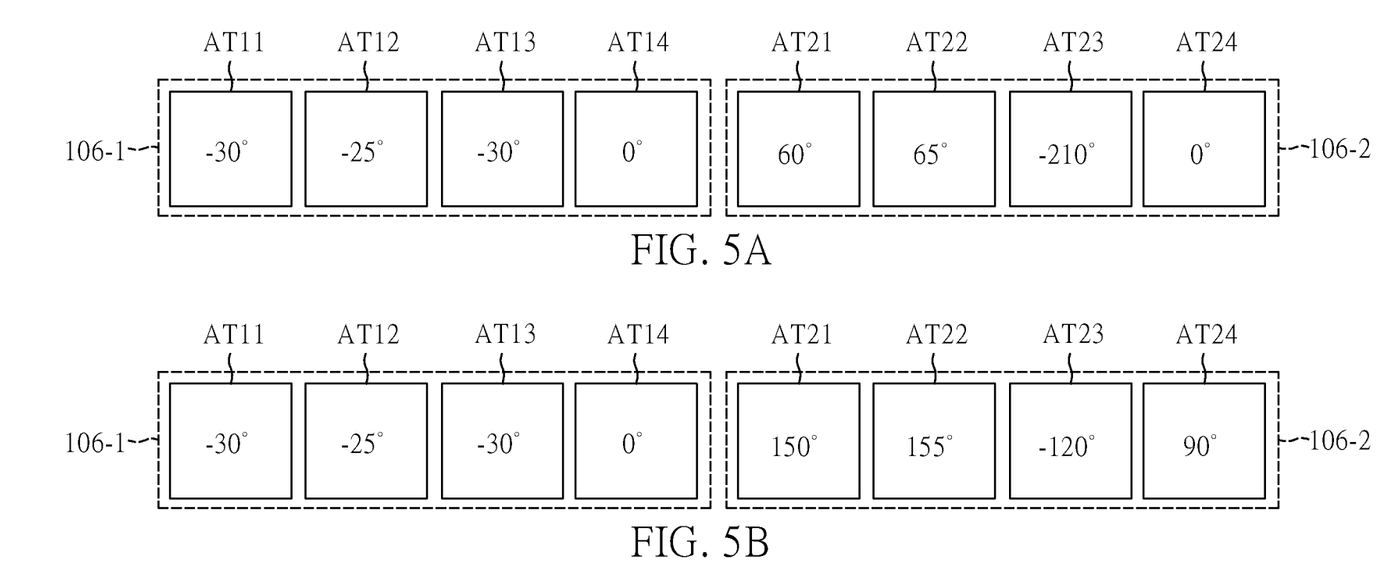
FIGS. 5A to 5C are schematic diagrams for generating a plurality of phases of one calibration codebook according to an embodiment of the present disclosure.
Figure 5C:
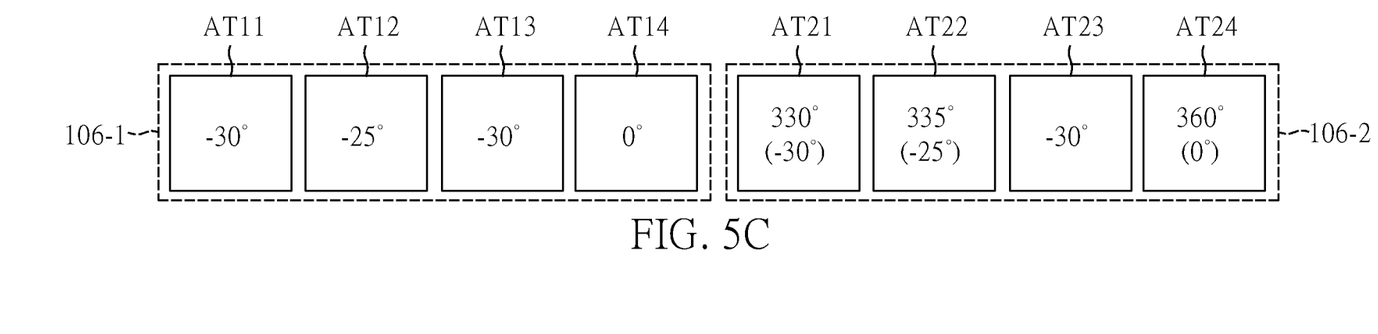

For example, for the antenna modules 106-1 and 106-2, the plurality of calibration codebooks CAL are used to eliminate a phase error between the antenna modules 106-1 and 106-2. Reference can be further made to FIGS. 5A to 5C, which are schematic diagrams for generating a plurality of phases of one calibration codebook according to an embodiment of the present disclosure.

In the present embodiment, two antenna modules 106-1 and 106-2 are also used as an example for description, and each antenna module still has four antenna elements. In the process of generating the reference codebook REF, 90, 95, −180, and 30 degrees of the initial phase differences of the antenna elements AT11, AT12, AT13, and AT14 have been shifted by −30 degrees, such that the phases of the antenna elements AT11, AT12, AT13 and AT14 becomes 60, 65, −210 and 0 degrees. On the other hand, in the process of generating the calibration codebook CAL for the antenna module 106-2, as shown in FIG. 5A, the antenna elements AT11, AT12, AT13, and AT14 can directly follow the result of minimizing based on 0 degrees in FIG. 4C, that is, phases of −30 degrees, −25 degrees, −30 degrees and 0 degrees.

In this step, the calibration codebooks CAL generated based on the predetermined phase differences have been described. In detail, the plurality of predetermined phase differences can range between 0 degrees and 360 degrees, the plurality of predetermined phase differences are determined by dividing 360 degrees by a number of tests, and the number of calibration codebooks CAL corresponds to the number of tests. For example, 360 degrees can be divided by the number of tests with a number of 36. The plurality of predetermined phase differences of 0, 10, ... , 350 degrees can be obtained by using every 10 degrees as an interval from 0 degrees to 360 degrees. The number of tests depends on acceptable testing time, and the present disclosure is not limited thereto.

Next, a plurality of phase shifter calibration parameters can be generated based on the predetermined phase difference, for example, 90 degrees, and a reference phase. Taking FIG. 5B as an example, when the predetermined phase difference is 90 degrees, the phases 60, 65, −210, and 0 of the antenna elements AT21, AT22, AT23, and AT24 are added to the predetermined phase difference of 90 degrees, the phases of the antenna elements AT11, AT12, AT13, and AT14 remains unchanged, and the phases 150, 155, −120, and 90 degrees as shown in FIG. 5B are obtained.

Next, the phase shifters corresponding to the antenna elements AT21, AT22, AT23, and AT24 can be adjusted to minimize phases of the antenna elements AT21, AT22, AT23, and AT24 relative to 0 degrees, thereby performing phase matching for the predetermined phase difference of 90 degrees. Unlike the reference codebook REF, it is necessary to adjust the phase difference of the antenna elements AT21, AT22, AT23, and AT24 with the phase shifter parameters of 180 degrees, 180 degrees, 90 degrees, and 270 degrees, respectively, to obtain 330 degrees, 335 degrees, −30 degrees and 360 degrees. In this case, since the phase uses 360 degrees as one cycle, and the phase of 330 degrees equals −30 degrees, the phase of 335 degrees equals −25 degrees, the phase of 360 degrees equals 0 degrees, which are minimum results relative to 0 degrees. At this time, the phase shifter parameters at pattern 1 of the calibration codebook CAL, i.e., an angle of 0 degrees, are respectively obtained to be 180 degrees, 180 degrees, 90 degrees and 270 degrees. Next, for other angles, phase shifter parameters of other patterns can be generated in the same manner by rotating the beamforming device 10 or the receiver 14 to obtain one of the calibration codebook CAL.

Similarly, 36 calibration codebooks CAL corresponding to the predetermined phase differences of 10, 20, . . . , 350 degrees can be generated based on the plurality of predetermined phase differences of 10, . . . , 350 degrees, respectively, and the above process can be applied on the antenna modules 106-2 to 106-M to generate a plurality of calibration codebooks CAL corresponding to the antenna modules 106-2 to 106-M, respectively. For a predetermined phase difference of 0 degrees, the reference codebook REF can be directly used.

Step S102: selecting a predetermined target pattern, e.g., 0 degrees, and configuring, according to the predetermined target pattern, the baseband circuit to use the plurality of records of calibration control corresponding to the predetermined target pattern in the reference codebook REF and the plurality of calibration codebooks CAL to respectively control the plurality of antenna modules to generate a plurality of test signals.

Step S103: configuring the receiver 14 to receive a plurality of test signals.

Figure 6:
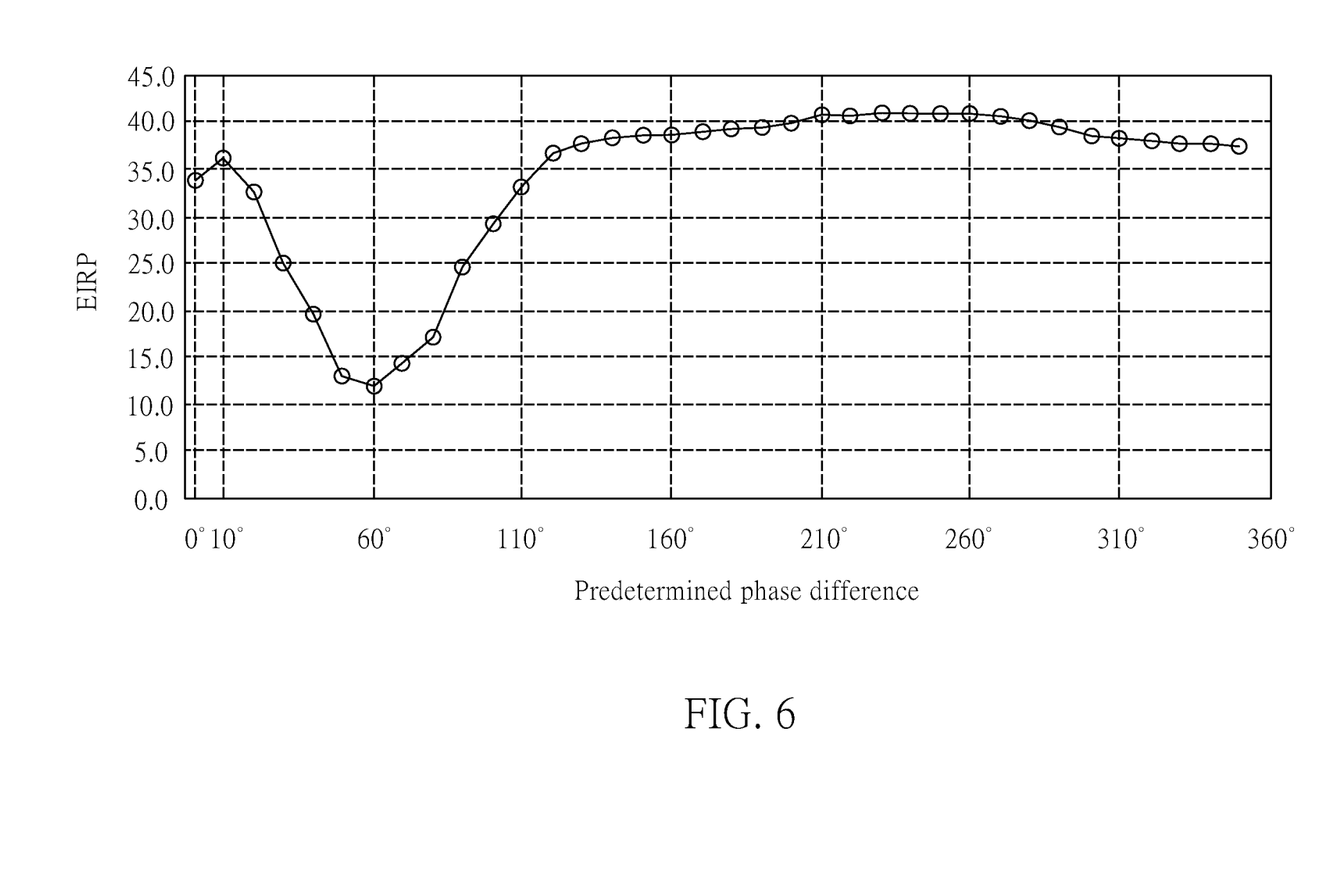
FIG. 6 is a graph of EIRP versus a plurality of predetermined phase differences in test results of the embodiment of the present disclosure.

Step S104: configuring the computing device 12 to process the plurality of test signals to respectively calculate equivalent isotropically radiated powers (EIRP) of the predetermined target patterns respectively corresponding to the plurality of test signals and generate a plurality of test results. Reference may be made to FIG. 6, which is a graph of EIRP versus a plurality of predetermined phase differences in test results of the embodiment of the present disclosure.

Step S105: configuring the computing device 12 to set one of the reference codebook REF and the calibration codebook CAL having the maximum EIRP as a predetermined codebook used in transmitting and receiving signals in the predetermined target pattern by the beamforming device according to the plurality of test results. For example, as shown in FIG. 6, when the predetermined phase difference is 240 degrees, the maximum EIRP can be obtained by using the calibration codebook CAL. Therefore, the calibration codebook CAL adjusted by the predetermined phase difference of 240 degrees can be set to the predetermined codebook used by the beamforming device to transmit and receive signals at the predetermined target pattern. Here, it can be explained with reference to FIG. 2, the difference between the antenna module 106-1 and the antenna module 106-2 may be about 240 degrees, that is, the phase difference between θ 1 and θ 2. The calibration codebook CAL for compensating the 240-degree phase difference can be found by utilizing the calibration method of the present disclosure. In particular, the greater the number of the calibration codebooks CAL, that is, the greater the number of the predetermined phase differences, the higher the accuracy of calibration.

Preferably, the computing device 12 can be configured to generate instruction data INS based on the above steps and store the instruction data INS in the memory unit 102. When the beamforming device 10 transmits and receives signals at a plurality of predetermined target patterns, the beamforming device 10 can use the calibration codebook CAL that can obtain the maximum ERIP to transmit and receive signals according to the instruction data INS.

Figure 7A:
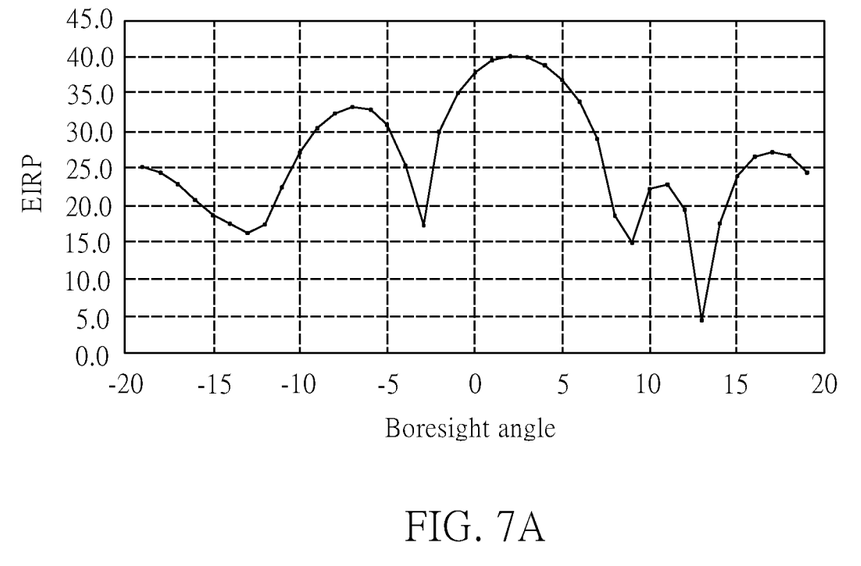
FIGS. 7A and 7B are respectively performance measurement charts before and after applying the calibration method for the beamforming device of the present disclosure.
Figure 7B:
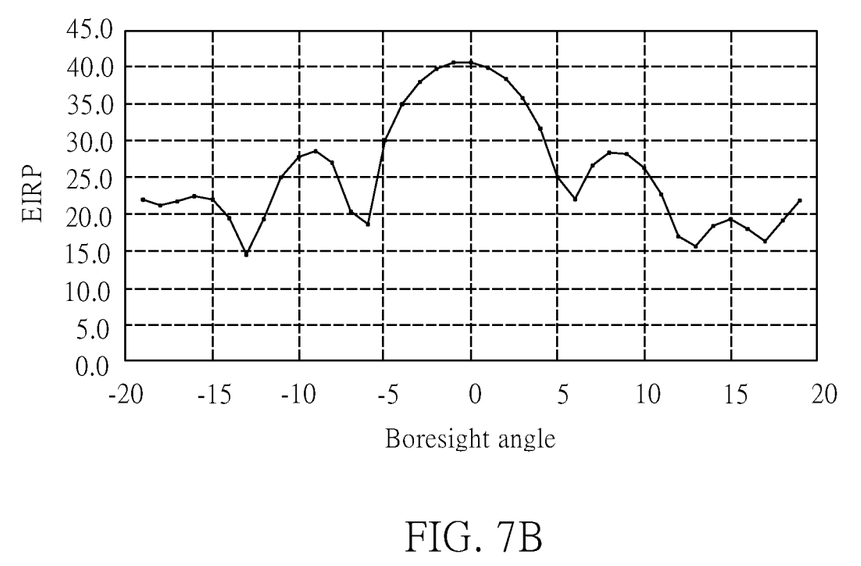

Reference is further made to FIGS. 7A and 7B, which are respectively performance measurement charts before and after applying the calibration method for the beamforming device of the present disclosure. However, before applying the calibration method for the beamforming device of the present disclosure, a main lobe of radiation patterns of the beamforming device deviates from the predetermined pattern and does not have the maximum EIRP at 0 degrees. After applying the calibration method for the beamforming device of the present disclosure, the main lobe can be redirected to the desired direction, so that the overall performance matches the original design specifications.

In other words, after applying the calibration method for the beamforming device of the present disclosure, a beamforming device 10 shown in FIG. 1 can be further provided, which includes a processor 100, a memory unit 102, a baseband circuit 104, and multiple antennas modules 106-1 through 106-M. The memory unit 102 stores a reference codebook REF, a plurality of calibration codebooks CAL, and instruction data INS. Each of the plurality of calibration codebooks CAL includes a plurality of records of calibration control data divided by a plurality of target patterns, and a plurality of predetermined phase differences that are different from each other respectively existed between the plurality of calibration codebooks CAL and the reference codebook REF. The instruction data INS is used for instructing the baseband circuit 14 to use one of the reference codebook REF and the plurality of calibration codebooks CAL in transmitting and receiving signals with a plurality of predetermined target patterns.

Figure 8A:
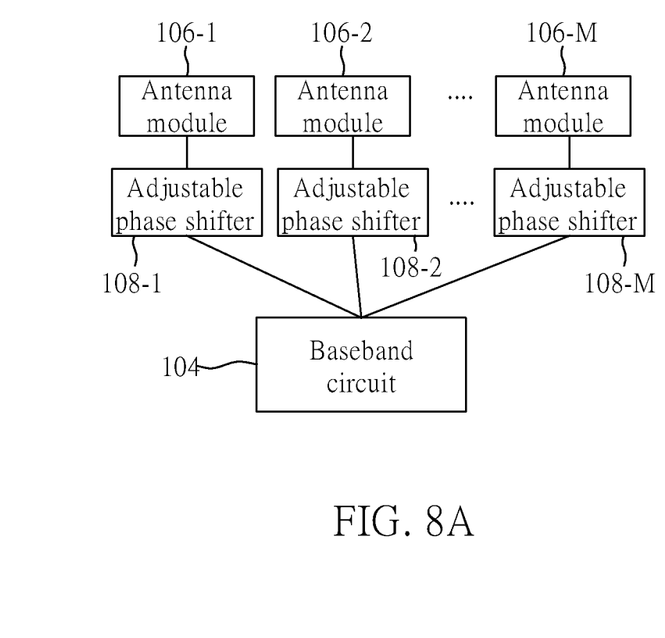
FIG. 8A is a schematic diagram of a hardware architecture of a baseband circuit, an adjustable phase shifter, and an antenna module according to an embodiment of the present disclosure.
Figure 8B:
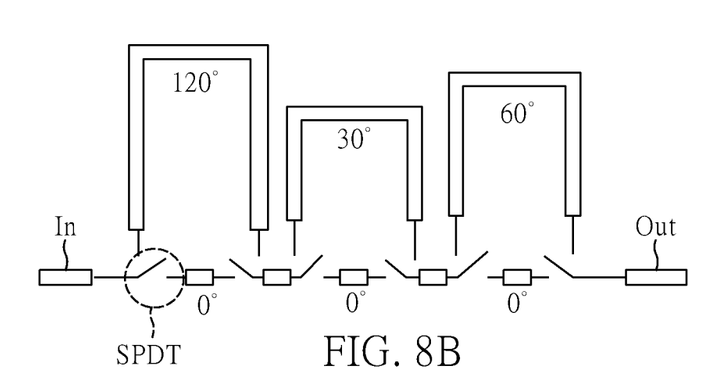
FIGS. 8B and 8C are schematic diagrams of an adjustable phase shifter according to an embodiment of the present disclosure.
Figure 8C:
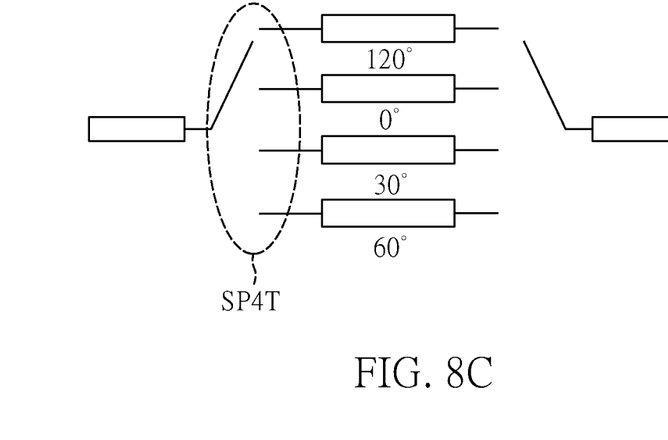

In alternative embodiments, reference may be made to FIGS. 8A, 8B, and 8C. FIG. 8A is a schematic diagram of a hardware architecture of a baseband circuit, an adjustable phase shifter, and an antenna module according to an embodiment of the present disclosure. As shown in FIG. 8A, adjustable phase shifters 108-1, 108-2, . . . , 108-M can be further provided between the antenna modules 106-1, 106-2, . . . , 106-M and the baseband circuit 104, respectively. The phase shifters 108-1, 108-2, . . . , 108-M can be digital phase shifters or mechanical phase shifters, respectively, which will be added to the design for phase adjustment. It should be noted that resolutions of the adjustable phase shifters 108-1, 108-2, . . . , 108-M depend on specifications of the adjustable phase shifters.

The adjustable phase shifters 108-1, 108-2, . . . , 108-M shown in FIG. 8B can be provided with multiple single pole double throw (SPDT) switches SPDT in multiple phase delay lines (for example, 0, 30, 60, 120 degrees) and between an input terminal In and an output terminal Out, or can be provided with a plurality of single pole four throw switches SP4T in multiple phase delay lines (e.g., 0, 30, 60, 120 degrees) and between the input terminal In and the output terminal Out as shown in FIG. 8C. The SPDT switches and the SP4T switches can be controlled by the baseband circuit 104, whose control principle is similar to the foregoing embodiment including controlling the SPDT switches and the SP4T switches to generate a plurality of predetermined phase differences according to the plurality of predetermined patterns for the antenna modules 106-1, 106-

2, ..., 106-M, performing detections by the computing device 12 and the receiver 14 to find the predetermined phase difference corresponding to the largest EIRP and setting this phase difference as the configuration used by the beamforming device 10 for signal transmission and reception, thereby reducing the phase differences between different antenna modules due to the manufacturing process. In some embodiments, resolutions of the adjustable phase shifters can be 360/n degrees, where n is a positive integer corresponding to the aforementioned number of tests, and the larger the n, the higher the resolutions.

Therefore, in addition to using software to implement the beamforming device, the calibration method and the calibration system for the same provided by the present disclosure, it can also be implemented by hardware, and the present disclosure is not limited thereto.

In conclusion, the beam forming device, the calibration method and the calibration system for the same provided by the present disclosure can generate a plurality of calibration codebooks corresponding to the plurality of antenna modules according to the plurality of predetermined phase differences and the reference codebook, and set predetermined codebooks for the beamforming device in transmitting and receiving signals according to test results. Therefore, when an actual beamforming pattern differs from an ideal beamforming pattern by a deviation due to errors between the antenna modules, the radiation pattern can be redirected to the desired direction through calibration, thereby making the overall performance match original design specifications.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A calibration method for a beam forming device, used for the beam forming device including a processor, a memory unit, a baseband circuit and a plurality of antenna module, the calibration method comprising:
    storing a reference codebook in the memory unit, wherein the reference codebook includes a plurality of records of reference control data divided by a plurality of target patterns, and the plurality of records of reference control data are used to set a plurality of antenna elements of each of the antenna modules, and a plurality of phase shifters and a plurality of amplifiers respectively corresponding to the plurality of antenna elements;
    generating a plurality of calibration codebooks according to the reference codebook and a plurality of predetermined phase differences to be stored in the memory unit, wherein the plurality of predetermined phase differences are different from each other, and the plurality of calibration codebooks each include a plurality of records of calibration control data divided by the plurality of target pattern;
    selecting a predetermined target pattern, and configuring, according to the predetermined target pattern, the baseband circuit to use the plurality of records of calibration control corresponding to the predetermined target pattern in the reference codebook and the plurality of calibration codebooks to respectively control the plurality of antenna module to generate a plurality of test signals;
    configuring a receiver to receive the plurality of test signals;
    configuring a computing device to process the plurality of test signals to respectively calculate equivalent isotropically radiated powers (EIRP) of the predetermined target patterns respectively corresponding to the plurality of test signals and generate a plurality of test results; and
    configuring the computing device to set one of the reference codebook and the calibration codebooks having the maximum EIRP as a predetermined codebook used in transmitting and receiving signals in the predetermined target pattern by the beamforming device according to the plurality of test results.

2. The calibration method according to claim 1, wherein each of the plurality of records of reference control data includes a plurality of phase shifter reference parameters and a plurality of amplifier reference parameters used for setting each of the plurality of antenna modules, the plurality of phase shifter reference parameters correspond to a plurality of reference phases, and the plurality of amplifier reference parameters correspond to a plurality of switching state codes used to indicate switching states of the plurality of amplifiers;
    wherein each of the plurality of records of calibration control data includes a plurality of phase shifter calibration parameters and a plurality of amplifier calibration parameters used for setting each of the plurality of antenna modules;
    wherein a step of generating the plurality of calibration codebooks according to the reference codebook and the plurality of predetermined phase differences further includes generating the plurality of phase shifter calibration parameters based on the plurality of predetermined phase differences and the plurality of reference phases.

3. The calibration method according to claim 2, wherein the plurality of predetermined phase differences range between 0 degrees to 360 degrees, the plurality of predetermined phase differences are determined by dividing 360 degrees by a number of tests, and a number of the plurality of calibration codebooks corresponds to the number of tests.

4. The calibration method according to claim 2, further comprising:
    after respectively adding the plurality of predetermined phase differences to the plurality of reference phases, respectively minimizing the plurality of reference phases based on a phase reference value, to generate a plurality of the phase shifter calibration parameters.

5. The calibration method according to claim 1, wherein a number of the plurality of records of reference control data corresponds to a total number of the plurality of antenna elements of the plurality of antenna modules.

6. A calibration system for beamforming device, comprising:
    a computing device;
    a beamforming device connected to the computing device and including:
        a processor;
        a memory unit;
        a baseband circuit; and a plurality of antenna modules, each including a plurality of antenna elements, and a plurality of phase shifters and a plurality of amplifiers respectively corresponding to the plurality of antenna elements; and a receiver;

wherein the computing device is configured to store a reference codebook into the memory unit, the reference codebook includes a plurality of records of reference control data divided by a plurality of target patterns, and the plurality of records of reference control data are used to set a plurality of antenna elements of each of the antenna modules, and a plurality of phase shifters and a plurality of amplifiers respectively corresponding to the plurality of antenna elements;

wherein the computing device is configured to generate a plurality of calibration codebooks according to the reference codebook and a plurality of predetermined phase differences to be stored in the memory unit, the plurality of predetermined phase differences are different from each other, and the plurality of calibration codebooks each include a plurality of records of calibration control data divided by the plurality of target pattern;

wherein the baseband circuit is configured, according to a predetermined target pattern selected, to use the plurality of records of calibration control corresponding to the predetermined target pattern in the reference codebook and the plurality of calibration codebooks to respectively control the plurality of antenna module to generate a plurality of test signals;

wherein the receiver is configured to receive the plurality of test signals;

wherein the computing device is configured to process the plurality of test signals to respectively calculate equivalent isotropically radiated powers (EIRP) of the predetermined target patterns respectively corresponding to the plurality of test signals and generate a plurality of test results; and wherein the computing device is configured to set one of the reference codebook and the calibration codebooks having the maximum EIRP as a predetermined codebook used in transmitting and receiving signals in the predetermined target pattern by the beamforming device according to the plurality of test results.

7. The calibration system according to claim 6, wherein each of the plurality of records of reference control data includes a plurality of phase shifter reference parameters and a plurality of amplifier reference parameters used for setting each of the plurality of antenna modules, the plurality of phase shifter reference parameters correspond to a plurality of reference phases, and the plurality of amplifier reference parameters correspond to a plurality of switching state codes used to indicate switching states of the plurality of amplifiers;

wherein each of the plurality of records of calibration control data includes a plurality of phase shifter calibration parameters and a plurality of amplifier calibration parameters used for setting each of the plurality of antenna modules;

wherein the computing device is configured to generate the plurality of phase shifter calibration parameters based on the plurality of predetermined phase differences and the plurality of reference phases.

8. The calibration system according to claim 7, wherein the plurality of predetermined phase differences range between 0 degrees to 360 degrees, the plurality of predetermined phase differences are determined by dividing 360 degrees by a number of tests, and a number of the plurality of calibration codebooks corresponds to the number of tests.

9. The calibration system according to claim 7, wherein the computing device is configured to, after respectively adding the plurality of predetermined phase differences to the plurality of reference phases, respectively minimize the plurality of reference phases based on a phase reference value, to generate a plurality of the phase shifter calibration parameters.

10. The calibration system according to claim 6, wherein a number of the plurality of records of reference control data corresponds to a total number of the plurality of antenna elements of the plurality of antenna modules.

11. A beamforming device, comprising:
a processor;
a memory unit;
a baseband circuit; and
a plurality of antenna modules, each including a plurality of antenna elements, and a plurality of phase shifters and a plurality of amplifiers respectively corresponding to the plurality of antenna elements, wherein the memory unit stores:
a reference codebook and a plurality of calibration codebooks, each of the plurality of calibration codebooks includes a plurality of records of calibration control data divided by a plurality of target patterns, and a plurality of predetermined phase differences that are different from each other respectively exist between the plurality of calibration codebooks and the reference codebook; and instruction data for instructing the beamforming device to use one of the reference codebook and the plurality of calibration codebooks in transmitting and receiving signals with a plurality of predetermined target patterns.

* * * * *